(12) United States Patent
Salowsky et al.

(10) Patent No.: US 12,740,552 B2
(45) Date of Patent: Sep. 22, 2026

(54) HOOF BOOT, METHOD FOR PRODUCING A HOOF BOOT AND USE OF A HOOF BOOT

(71) Applicant: Goodsmith GmbH, Planegg (DE)

(72) Inventors: Simon Salowsky, Planegg (DE); Bennet Klein, Planegg (DE)

(73) Assignee: Goodsmith GmbH, Planegg (DE)

( * ) Notice: Subject to any disclaimer, the term of this patent is extended or adjusted under 35 U.S.C. 154(b) by 0 days.

(21) Appl. No.: 18/964,296

(22) Filed: Nov. 29, 2024

(65) Prior Publication Data

US 2025/0089694 A1 Mar. 20, 2025

Related U.S. Application Data

(63) Continuation of application No. PCT/DE2023/100384, filed on May 24, 2023.

(30) Foreign Application Priority Data

May 31, 2022 (DE) ..................... 10 2022 113 762.7

(51) Int. Cl.
*A01L 3/02* (2006.01)

(52) U.S. Cl.
CPC ..................................... *A01L 3/02* (2013.01)

(58) Field of Classification Search
CPC ..... A01L 3/02; A01L 3/04; A01L 3/06; A01L 3/00
USPC ............. 168/1, 4; 54/82; D30/148; D2/915; 36/111
See application file for complete search history.

(56) References Cited

U.S. PATENT DOCUMENTS 1,083,968 A * 1/1914 Whitaker .................. A01L 7/04 168/30
1,386,613 A * 8/1921 Frey .......................... A01L 3/00 168/1
6,192,989 B1 * 2/2001 Tooman .............. A01K 13/007 54/82

(Continued)

FOREIGN PATENT DOCUMENTS

DE 102006006880 B4 12/2007
DE 102015010607 A1 2/2017

(Continued)

OTHER PUBLICATIONS

International Search Report and written opinion dated Jul. 24, 2023, of international application PCT/DE2023/100384 (on which this application is based), and English language machine translation thereof.

(Continued)

*Primary Examiner* — Zoe Tam Tran
(74) *Attorney, Agent, or Firm* — Ewers IP Law PLLC; Falk Ewers

(57) ABSTRACT

The present disclosure relates to a hoof boot including at least the following components: a base plate, at least two side parts, and at least one heel strap. Known hoof boots are assembled from standardized components, given that a good fit can only be achieved via strong and potentially painful tightening or a complex method when putting on the hoof boot. To solve this problem, at least one of the components is produced by an additive manufacturing method, by which a precise fit of the hoof boot is enabled. In addition, the disclosure relates to a method for producing such a hoof boot and its use.

11 Claims, 6 Drawing Sheets

(56) References Cited

U.S. PATENT DOCUMENTS

| | | | | |
|---|---|---|---|---|
| 6,305,328 | B1 | 10/2001 | Marquis | |
| 8,196,378 | B2 * | 6/2012 | Ford | A01K 13/007 54/82 |
| 2005/0066632 | A1 * | 3/2005 | Ford | A01K 13/007 54/82 |
| 2010/0229508 | A1 * | 9/2010 | Gola | A01K 13/007 54/82 |
| 2011/0000173 | A1 * | 1/2011 | Lander | A01L 3/04 54/82 |
| 2014/0262353 | A1 | 9/2014 | Bergeleen et al. | |
| 2015/0238344 | A1 * | 8/2015 | Nylund | A61F 5/0111 602/27 |
| 2017/0258066 | A1 | 9/2017 | Stevenson et al. | |
| 2018/0001371 | A1 | 1/2018 | Rooryck et al. | |
| 2018/0042210 | A1 | 2/2018 | Edwards | |
| 2019/0364848 | A1 * | 12/2019 | Ford | A01K 13/007 |

FOREIGN PATENT DOCUMENTS

| | | | |
|---|---|---|---|
| EP | 0207110 | B1 | 5/1989 |
| EP | 1008295 | A2 | 6/2000 |
| EP | 3595438 | B1 | 6/2023 |
| EP | 4294182 | B1 | 10/2025 |
| ES | 1242305 | U | 2/2020 |
| GB | 2575100 | B | 11/2021 |
| WO | 2018218307 | A1 | 12/2018 |

OTHER PUBLICATIONS

Office Action issued in German Patent Application No. DE 10 2022 113 762.7, dated Jan. 27, 2023, (from which this application claims priority) and English language machine translation thereof.

International Preliminary Report on Patentability and Written Opinion dated Nov. 7, 2024, of international application PCT/DE2023/100384 (on which this application is based) and English-language translation thereof.

Evo, “Evo Boot Premium 2021”, product website, https://evo-boot.com/horse-owner/, accessed on Jul. 15, 2026, Avenida del Deporte, 3-3° P., 33300 Villaviciosa, Asturias, Spain.

Horse Solution SL, “Explora Magic—Explora Horse Boots”, product website, https://explorahorseboots.com/en/explora-magic/, accessed on Jul. 15, 2026.

Report on Third Party Observations dated May 20, 2026, issued in European counterpart application No. 23 728 264.5 and English-language machine translation thereof.

* cited by examiner

HOOF BOOT, METHOD FOR PRODUCING A HOOF BOOT AND USE OF A HOOF BOOT

CROSS REFERENCE TO RELATED APPLICATIONS

This application is a continuation application of international patent application PCT/DE2023/100384, filed May 24, 2024, designating the United States and claiming priority from German application 10 2022 113 762.7, filed May 31, 2022, and the entire content of these applications is incorporated herein by reference.

TECHNICAL FIELD

The present disclosure relates to a hoof boot including at least one of the following components: a base plate, at least two side parts, and at least one heel strap. In addition, the disclosure relates to a method for producing such a hoof boot and its use.

BACKGROUND

A hoof boot is known from EP 1 008 295 A2. A similar system is further known from ES 1 242 305 U.

Hoof boots represent an alternative to the long-known and widely used horseshoes. The latter are typically made of an inelastic, metallic material. Horseshoes therefore contribute the hoof and therefore the horse to slip on relatively hard underlying surfaces such as asphalt. Likewise, they are not able to compensate for uneven ground in the same way that an unshod hoof can.

Furthermore, they do not offer any damping function, but can instead cause vibrations that are harmful to the hoof. In addition, horseshoes are typically attached to the hoof with nails, which causes damage to the hoof and facilitates the penetration of pests and pathogens. In addition, the natural hoof movement, and thus the so-called hoof pump, is severely restricted, if not completely prevented, by conventional horseshoes.

Many of the problems listed above can be solved by using hoof boots. In addition, hoof boots are produced from a plastic, by which a damping function can be achieved, and uneven ground can be compensated for. The provision of a profile on the lower side of the hoof boot increases the grip on all underlying surfaces. Since the hoof boot is fastened around the hoof, there is no need for nails to fasten it, which can cause damage to the hoof. The natural hoof movement and thus the hoof pump are less impaired than with conventional horseshoes. In addition, hoof boots offer the advantage that they can be put on and taken off depending on the situation. They can be used for greater exertion, for example during horse riding or sporting events. In contrast, in the stable, in the paddock, or on the pasture and possibly during lesser exertion, such as a walk, the horse can go "barefoot" such that the natural hoof movement and thus the hoof pump are not impaired. This allows the animal to walk barefoot, for example in the pasture, in a way that is beneficial to its health.

Hoof boots known from the related art all have the disadvantage that they are composed of standardized components. While this is economically reasonable, it does mean that in most cases a perfect fit of the hoof boot cannot be achieved. For animal hooves, as for human feet, no two are identical. A non-optimal fit either causes the hoof to move in the hoof boot under high loads, such as when galloping, or that a fixation that is too tight in the pastern area can cause pain to the animal. Known hoof boots are also regularly lost by the horse. It often happens that different hoof boots, even from different producers, have to be selected for the different hooves of a horse in order to provide a reasonably good fit.

To solve this problem, EP 1 008 295 A2 mentioned at the beginning uses an elastically deformable material which is pressurized by a fluid and thus adapts to the shape of the hoof. Such a design requires additional components and increases the effort involved in putting on the hoof boots enormously, as the hoof boots have to be adjusted each time they are put on and typically on all four hooves.

Putting on the ES 1 242 305 U hoof boot requires less effort. To make it easier to get into the hoof boot, a flap is folded down in the heel or frog cushion area. This flap is then fixed to the rest of the hoof boot via a strap. Inaccuracies in the fit of the hoof boot cannot be compensated for, but can only be overlaid with increased strap tension. This exerts increased pressure, particularly on the sensitive frog cushion area, which causes pain and promotes misalignment.

SUMMARY

It is therefore an object of the present disclosure to provide a hoof boot which is configured to fit so precisely that movement of the hoof in the hoof boot is ensured even without strong tension, and which can also be put on with little effort. Furthermore, a method for producing such a hoof boot and its use are aspects of the present disclosure.

This object is achieved by a hoof boot and method for producing a hoof boot as described herein.

The hoof boot according to an exemplary embodiment of the disclosure has a base plate which, similar to a shoe sole, establishes contact between the hoof and the ground. To ensure a good grip and good damping properties, the base plate is manufactured from plastic material and is provided with a profile on its lower side.

At least two side parts extend from the side edges of the base plate essentially in a vertical direction, wherein their shape follows the course of the hoof. They therefore describe a partially cylindrical or conical profile that is inclined backwards when viewed in the direction of movement of the animal.

From the rear area of the base plate, at least one heel strap also extends essentially in a vertical direction and follows the shape of the hoof in the heel area. This prevents the hoof from being able to slip backwards out of the hoof boot. In conjunction with the at least two side parts, the hoof is fixed on the base plate in such a way that it cannot slip on it and losing the hoof boot is prevented.

According to an exemplary embodiment of the disclosure, it is now provided for the first time to produce at least one of the above-mentioned components with an additive manufacturing method. In this method, which is also known as three-dimensional (3D) printing, a body is formed by computer-controlled layering of one or more liquid or solid materials according to predetermined dimensions and shapes. Since the (partial) curing of a freshly applied layer typically occurs directly, even complicated geometries can be created. The advantage, especially for individual pieces and small series, is that no specially manufactured tools, such as molds, are required.

For example, within the scope of the present disclosure, it is provided that the base plate of the hoof boot be produced according to an exemplary embodiment of the disclosure with an additive manufacturing method. This means that the special geometry of an individual hoof, especially the sole of the hoof, can be taken into consideration. It is also possible to compensate for anatomical misalignments of the hoof by shaping the base plate accordingly.

It is also possible to produce the at least two side parts and/or the at least one heel strap with an additive manufacturing method. With these components as well, the choice of 3D printing as a manufacturing method makes it possible to take special consideration of the characteristics of the corresponding areas of the hoof.

Additive manufacturing offers the option of integrally embodying several of the above-mentioned components. This eliminates the need for joining manufacturing methods such as gluing or screwing to attach the individual components to one another. Such joints always represent weak points, because of which an integral embodiment improves the robustness and durability of the hoof boot produced in this way.

According to an exemplary embodiment, at least two of the components, for example, the base plate and the at least two side parts, are integrally produced with the additive manufacturing method. Such an exemplary embodiment combines the requirement of a durable, robust product with the best possible adaptation to the individual hoof.

To improve the fixation of the hoof in the hoof boot, according to a further exemplary embodiment, at least one front strap is provided. This at least one front strap connects the at least two side parts in the front area of the hoof boot. Due to its elastic design, it exerts a mutually directed traction force on at least two side parts, which allows them to press against the hoof even better.

According to an exemplary embodiment, a gaiter is attached centrally to at least one heel strap. It extends in the area of the frog cushion and forks on both sides of the hoof. At least one tension strap is attached to each end of the gaiter. These, as well as at least one front strap, are made elastic. Its respective other end is attached to the at least two side parts. Such a construction of gaiter and at least two tension straps with their attachment to at least one heel strap or the at least two side parts enables an improvement of the vertical fixation of the hoof in the hoof boot. Even under high loads, such as when galloping, the hoof can be effectively prevented from lifting off the base plate.

To protect the sensitive frog cushion area from constriction due to increased pressure, a pad can be provided on the inside of the gaiter. This ensures that the force generated by at least two tension straps is distributed over a larger area of the frog cushion area, thus counteracting the formation of pressure and chafing points.

The combination of the above-mentioned features makes it possible to produce an individual hoof boot that is precisely tailored to the characteristics of a particular hoof and thus corresponds to the requirements of the animal in the best possible manner.

A method according to an exemplary embodiment of the disclosure for producing a hoof boot as described above includes, in a first step, receiving a data set which contains geometric information of a hoof. These can be, for example, dimensioned photographs of the hoof from different perspectives, a video recording of the hoof, or data from a (laser) measurement. Of course, other formats and data sources are also conceivable. Based on the received data set, a hoof boot geometry for the individual hoof is calculated in a second step. This can be done either in a fully automated manner or manually or at an intermediate level. In a subsequent step, this hoof boot geometry is used to create (three-dimensional) models of the individual components from which the hoof boot will later be assembled. According to an exemplary embodiment of the disclosure, the base plate is then manufactured based on the corresponding model with an additive manufacturing method. Finally, the individual components are (pre-)assembled to form a hoof boot.

According to an exemplary embodiment of the method according to the disclosure, in addition to the base plate, the at least two side parts and/or the at least one heel strap are also produced by an additive manufacturing method.

According to an exemplary embodiment, at least two of the components base plate, at least two side parts, and at least one heel strap are integrally produced with an additive manufacturing method. For example, the base plate and the at least two side parts or the base plate and the at least one heel strap can be integrally made.

According to an exemplary embodiment, the base plate, the at least two side parts, and the at least one heel strap are integrally made, wherein an additive manufacturing method is used for production.

A hoof boot as described above, which has been produced according to a method also described above, is used according to an exemplary embodiment of the disclosure on the hoof of an animal. It is particularly suitable for use on the hooves of a horse, as these are often exposed to special stresses as sporting animals. It is of course advisable to use such a hoof boot not only on one hoof, but on at least two, typically on all of the hooves of the horse. The high degree of individualization of the hoof boot produced with such a method makes it possible to produce and use an optimally adapted hoof boot for each individual hoof.

BRIEF DESCRIPTION OF THE DRAWINGS

The disclosure will now be described with reference to the drawings wherein.

DESCRIPTION OF EXEMPLARY EMBODIMENTS

Figure 1:
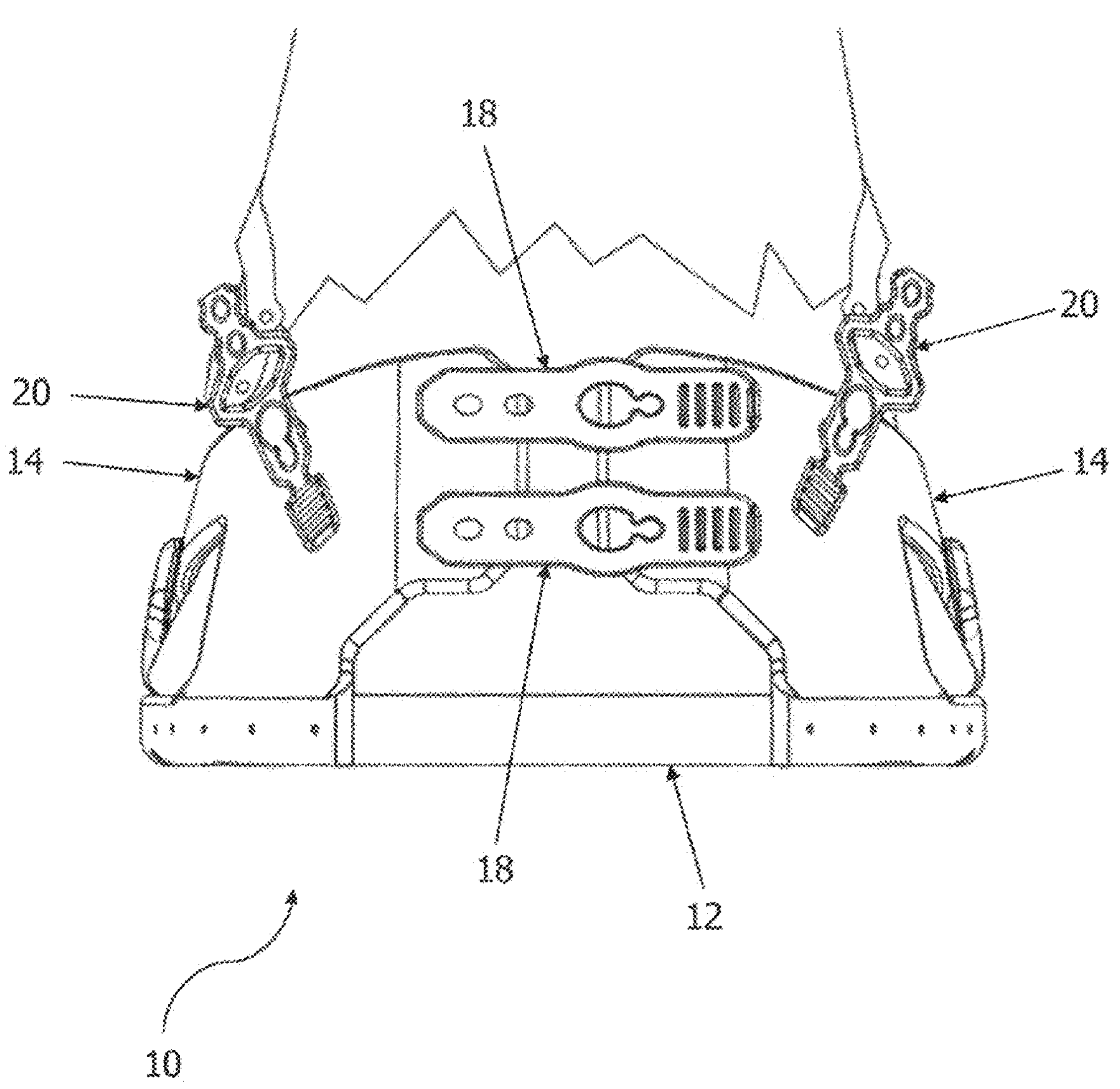
FIG. 1 shows a schematic front view of a hoof boot according to a first exemplary embodiment of the disclosure.
Figure 2:
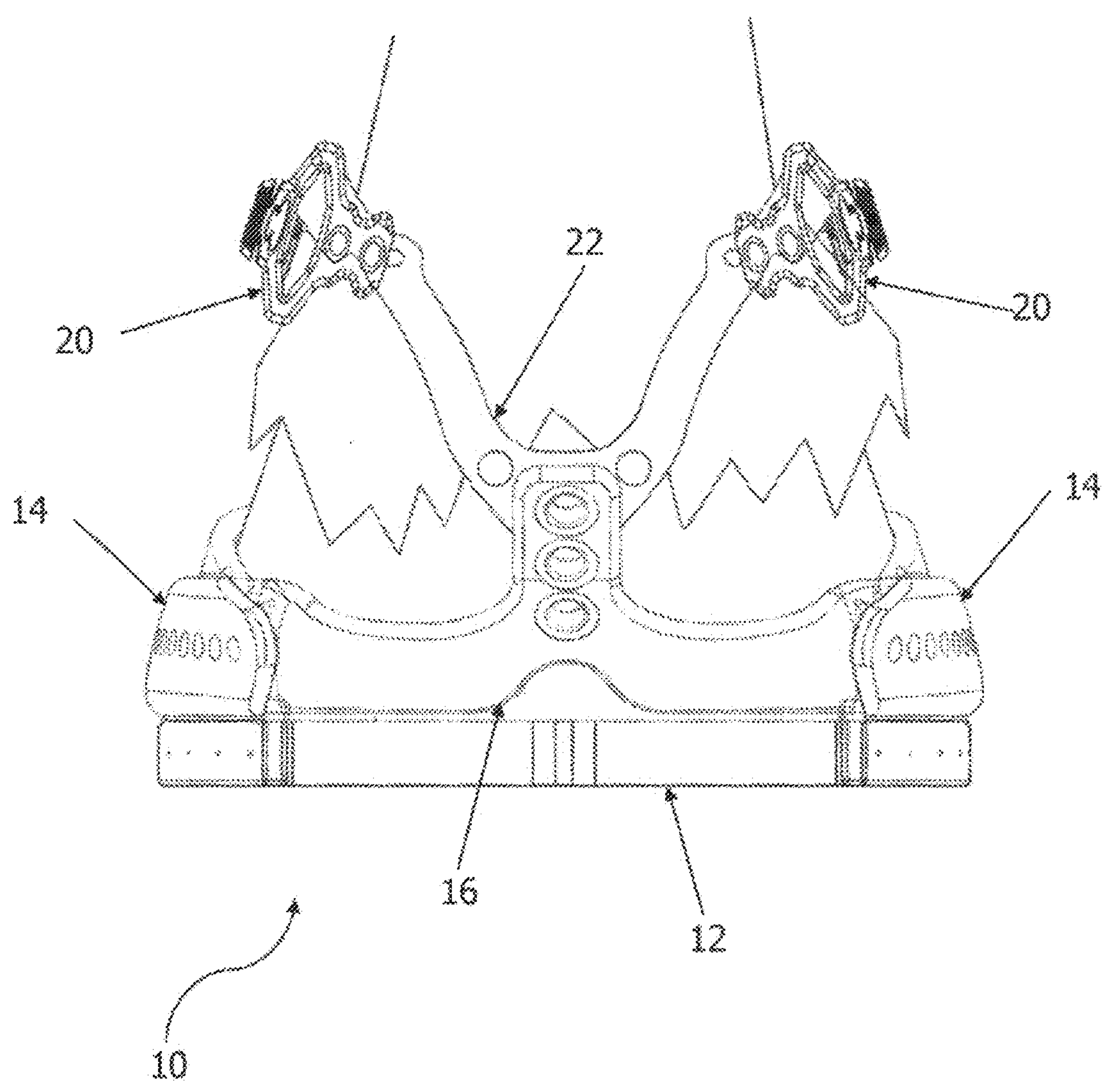
FIG. 2 shows a schematic rear view of the hoof boot shown in FIG. 1.
Figure 3:
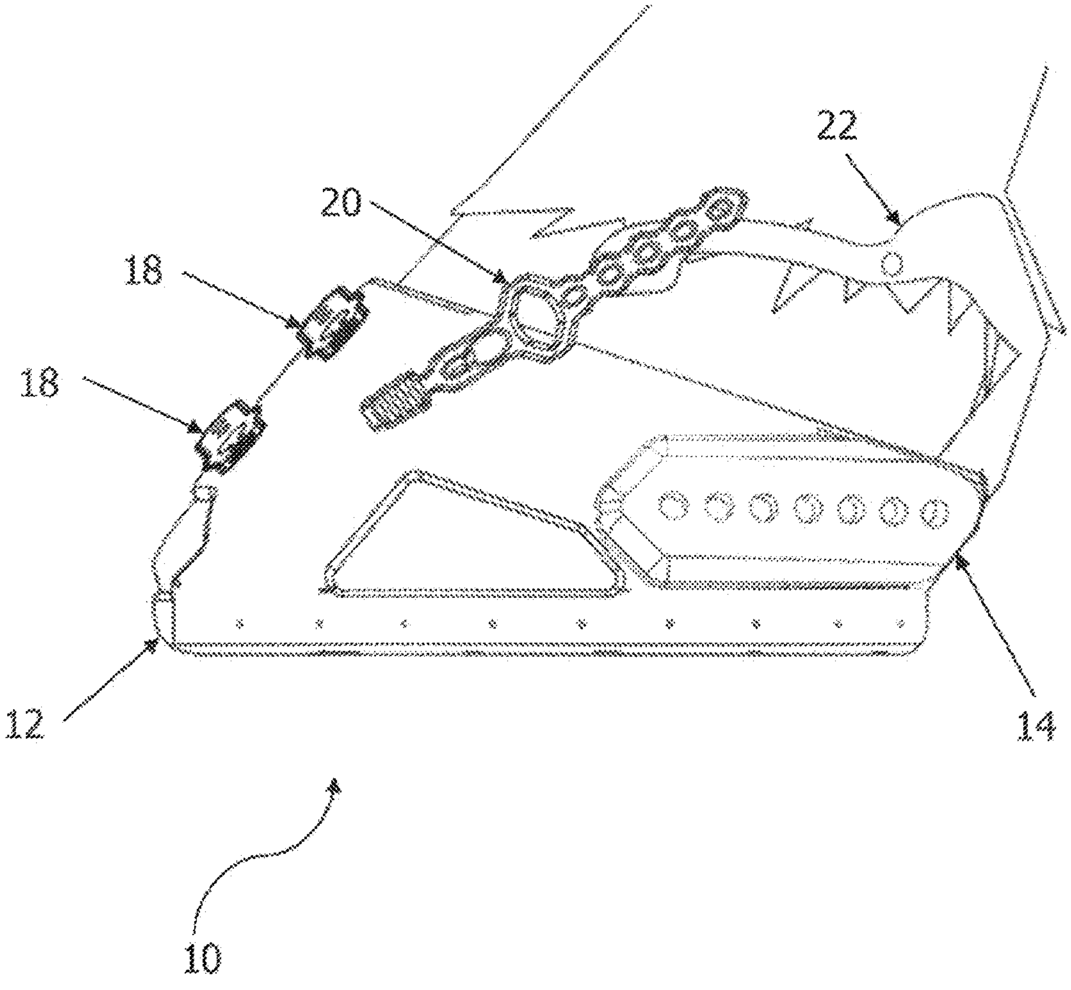
FIG. 3 shows a schematic side view of the hoof boot shown in FIG. 1.

FIGS. 1 to 3 show a hoof boot 10 according to a first exemplary embodiment of the disclosure in front view (FIG. 1), rear view (FIG. 2), and side view (FIG. 3), attached to a schematically shown hoof of an animal, for example a horse. The hoof boot 10 includes a base plate 12, which is provided between the hoof and an underlying surface. Furthermore, the hoof boot 10 includes two side parts 14, which are arranged essentially on the sides of the hoof when viewed in the direction of movement of the animal. The side parts 14 are joined to the base plate 12, for example via screws, nails, or an adhesive bond. In addition, other suitable joining methods can be considered. At the front side of the hoof, the two side parts 14 are connected with at least one front strap 18; in the illustrated exemplary embodiment, two front straps 18 are used. These exert a force directed towards one another on the two side parts, due to which they fit tightly to the hoof and prevent the hoof boot 10 from being lost.

As can be seen in FIG. 2, in the exemplary embodiment shown, a heel strap 16 is arranged on the back side of the hoof, the heel. Exemplary embodiments having two or more heel straps 16 are also conceivable. The at least one heel strap 16, in conjunction with the side parts 14, ensures that the hoof is almost completely enclosed by the components of the hoof boot 10. The heel strap 16 is joined to the side parts 14 and/or the base plate 12, for example via riveting, adhesive bonding, or other suitable joining methods.

Furthermore, FIG. 2 shows a gaiter 22 which is arranged centrally on the heel strap 16 and branches off on both sides of the hoof. It extends in the area above the frog cushion. Such a construction represents a further safeguard against the hoof inadvertently slipping out of the hoof boot 10. For this purpose, a tension strap 20 is provided at each end of the gaiter 22. For optimal clamping of the hoof in the hoof boot 10, the two tension straps 20 are each connected to one of the side parts 14.

According to an exemplary embodiment of the disclosure, the hoof boot 10 described above is characterized in that at least one of the components base plate 12, side parts 14, and heel strap 16 is produced with an additive manufacturing method. This allows for optimal individualization to the respective hoof, thereby achieving a health-enhancing and performance-enhancing effect in the respective animal. Of course, it is also possible to produce two or all three of the components base plate 12, side parts 14, and heel straps 16 with an additive manufacturing method. This can contribute to a further improvement of the fit of the hoof boot 10.

Figure 4:
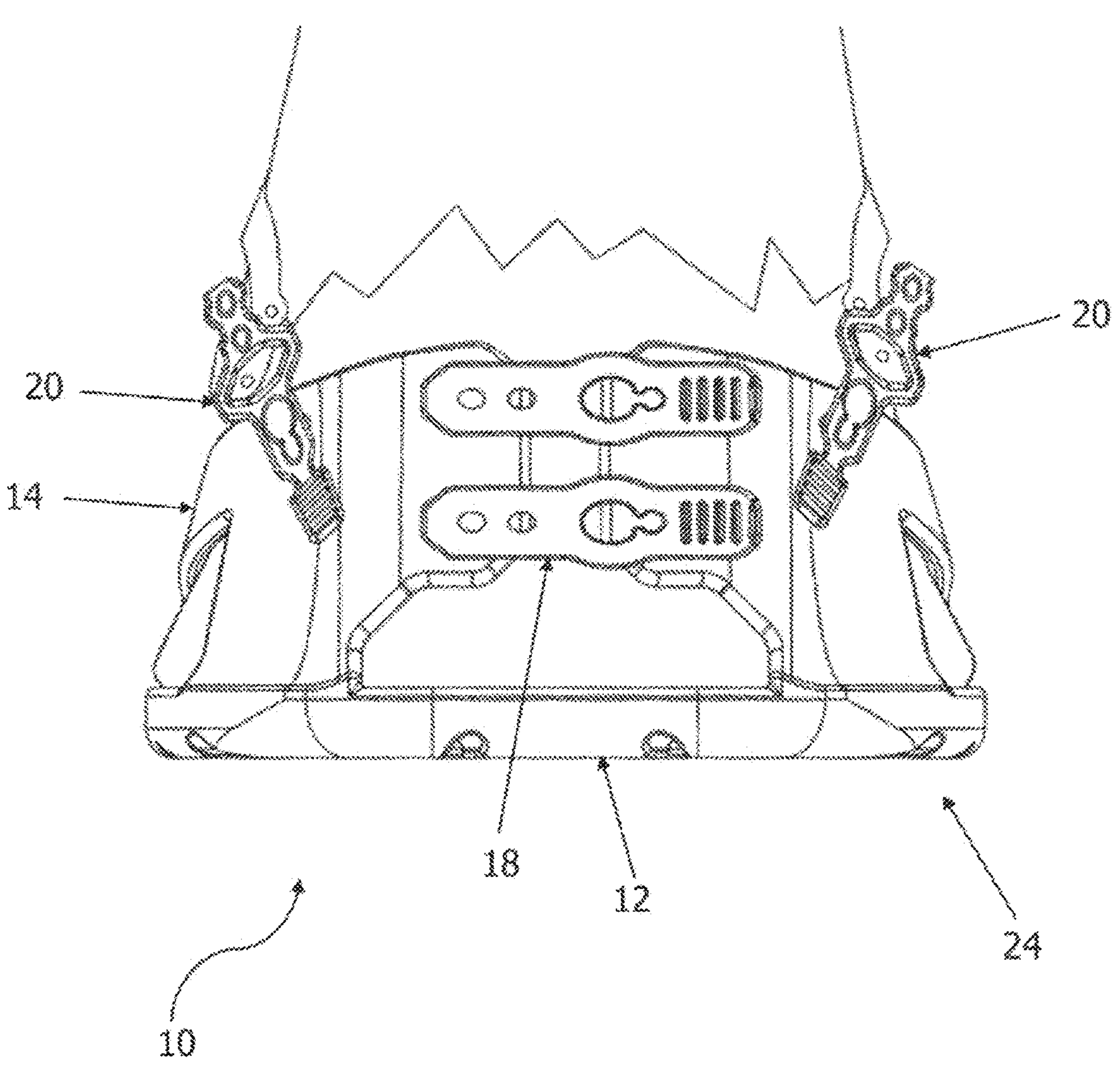
FIG. 4 shows a schematic front view of a hoof boot according to a second exemplary embodiment of the disclosure.
Figure 5:
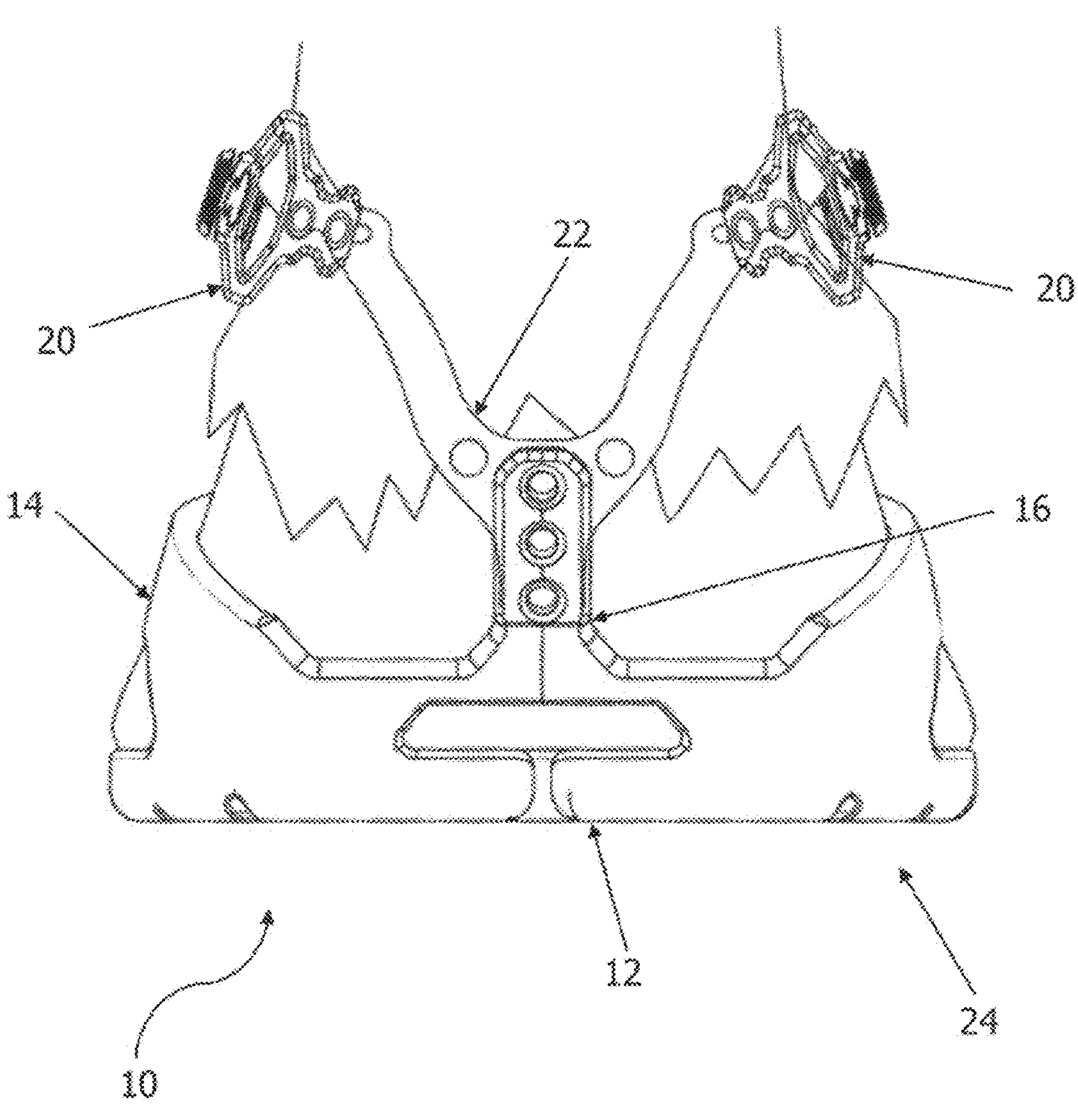
FIG. 5 shows a schematic rear view of the hoof boot shown in FIG. 4.
Figure 6:
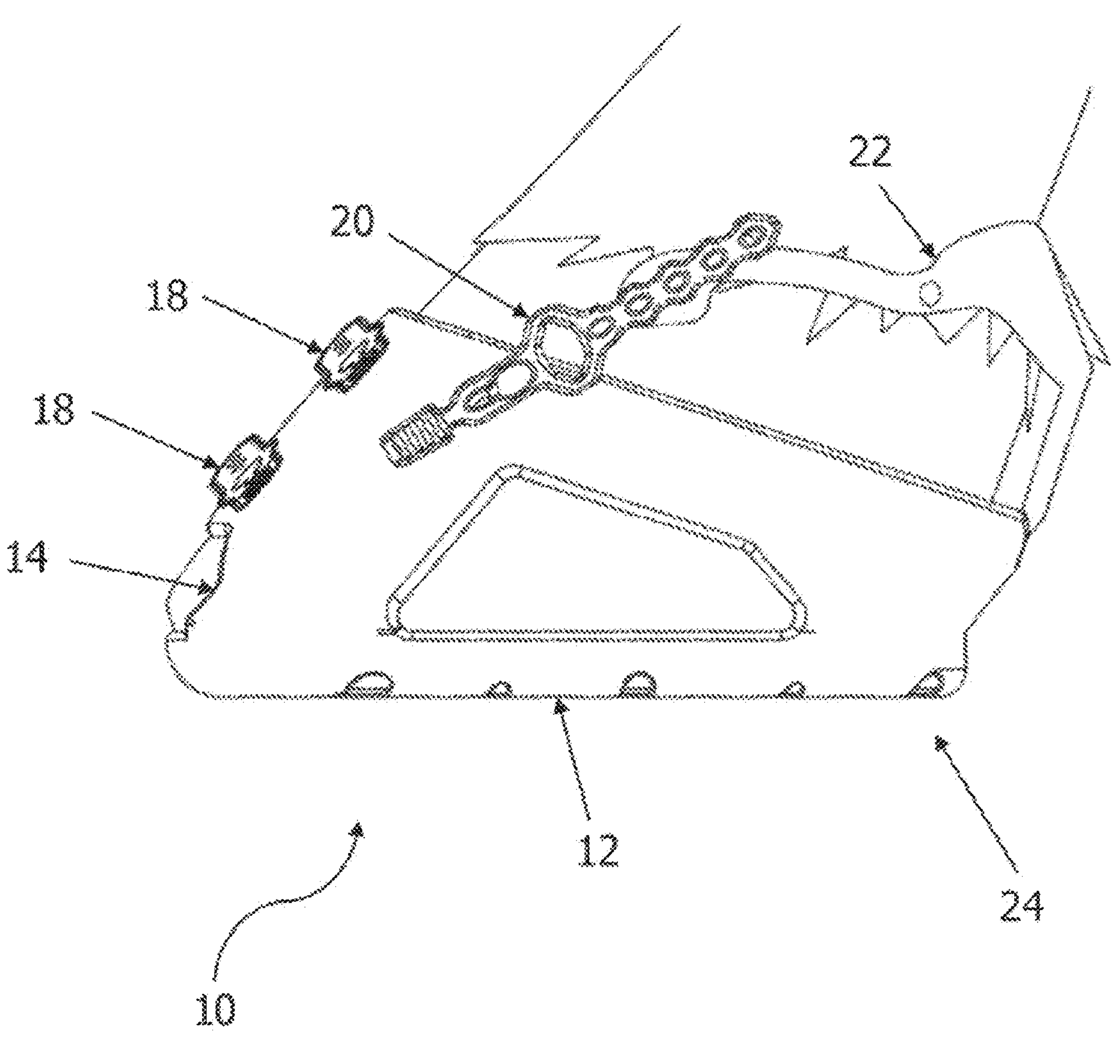
FIG. 6 shows a schematic side view of the hoof boot shown in FIG. 4.

A second exemplary embodiment of the hoof boot 10 according to the disclosure is shown in FIGS. 4 to 6. This is essentially similar to the first exemplary embodiment, which is shown in FIGS. 1 to 3. The difference is that in the second exemplary embodiment the components base plate, side parts, and heel straps are integrally embodied as a 3D shell 24. There is therefore no joining between the individual components, but an integral component is created during the primary shaping process, which combines the functions of the base plate, side parts, and heel straps. Such a construction has the advantage that the design-related weak points at the joints between the individual components can be avoided.

The other elements front strap 18, tension strap 20, and gaiter 22 are also present in the second exemplary embodiment in the same way, and their function remains the same. The only difference is that they are no longer arranged on the side parts 14/the heel strap 16, but on the corresponding geometries of the 3D shell 24.

Should it appear sensible in individual cases for economic or technical reasons, it would of course also be possible to integrally produce two of the three components base plate 12, side parts 14, and heel straps 16 with an additive manufacturing method and to join the remaining components with the geometry thus created.

LIST OF REFERENCE NUMERALS

10 hoof boot
12 base plate
14 side part
16 heel strap
18 front strap
20 tension strape
22 gaiter
24 3D-Shell

What is claimed is:

1. A hoof boot comprising:
a base plate;
a first side part and a second side part arranged at a distance from one another on the base plate;
at least one heel strap directly connected to the first side part at a first position on the first side part and directly connected to the second side part at a second position on the second side part;
a gaiter fastened on the at least one heel strap;
a first tension strap and a second tension strap, wherein the first tension strap is configured to directly connect the first side part to the gaiter at a third position on the first side part, and wherein the second tension strap is configured to directly connect the second side part to the gaiter at a fourth position on the second side part; and
a pad provided on an inside of the gaiter,
wherein at least one of the base plate, the first and second side parts, and the at least one heel strap is produced by an additive manufacturing method.

2. The hoof boot as claimed in claim 1, wherein at least two of the base plate, the first and second side parts, and the at least one heel strap are integrally produced with one another by the additive manufacturing method.

3. The hoof boot as claimed in claim 2, wherein at least the base plate and the first and second side parts are integrally produced with one another by the additive manufacturing method.

4. The hoof boot as claimed in claim 1, further comprising:
at least one front strap attached to the first and second side parts and configured to connect the first and second side parts in a front area of the hoof boot.

5. The hoof boot as claimed in claim 1, wherein the hoof boot is produced precisely fitted for a specific hoof of an equine animal.

6. The hoof boot as claimed in claim 5, wherein the equine animal is a horse.

7. The hoof boot as claimed in claim 4, wherein the hoof boot is produced precisely fitted for a specific hoof of an equine animal, and
wherein the at least one front strap exerts a mutually directed traction force on the first and second side parts such that the first and second side parts are pressed against the specific hoof of the equine animal.

8. The hoof boot as claimed in claim 1, wherein the heel strap has a shape of a “W”, and
wherein the gaiter is attached to a middle portion of the shape of the “W” of the heel strap.

9. The hoof boot as claimed in claim 8, wherein a position at which the gaiter is attached to the middle portion of the “W” shaped heel strap is adjustable on the heel strap.

10. The hoof boot as claimed in claim 1, wherein the at least one heel strap is directly connected to the base plate.

11. The hoof boot as claimed in claim 1, wherein a first distance between the first and third positions on the first side part and a second distance between the second and fourth positions on the second side part are defined such that the at least one heel strap and the first tension strap do not overlap on the first side part and such that the at least one heel strap and the second tension strap do not overlap on the second side part.

* * * * *